Aug. 10, 1926.
A. F. KLINZING
1,595,104
DRINKING FOUNTAIN
Filed July 28, 1924
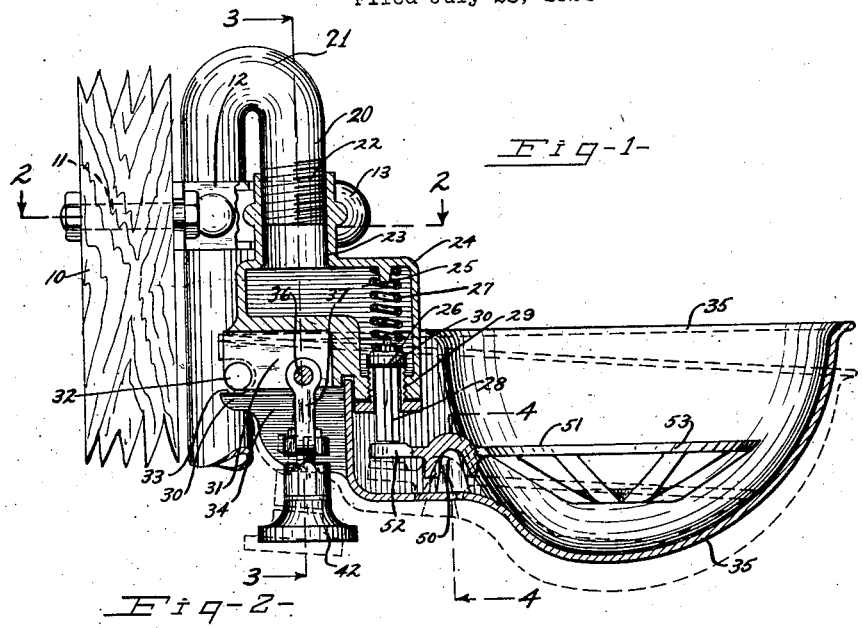
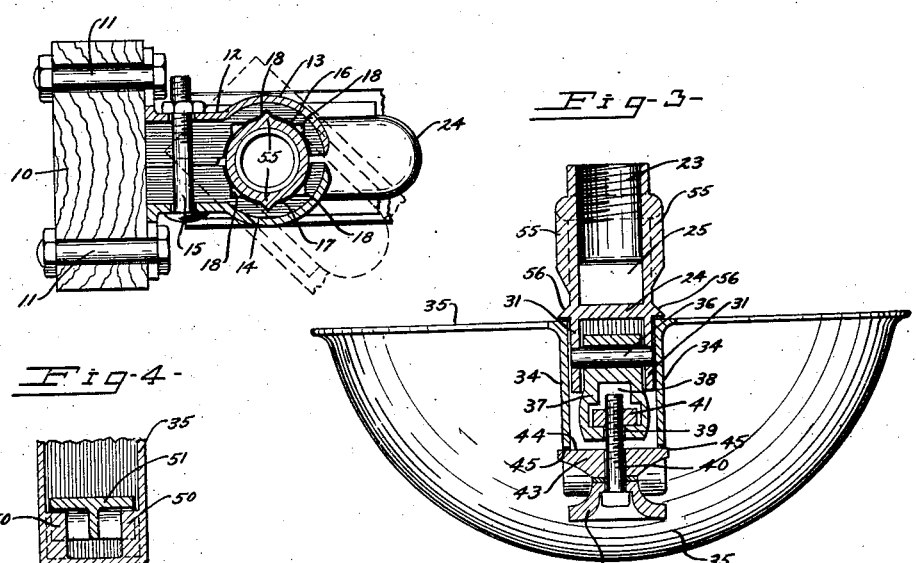
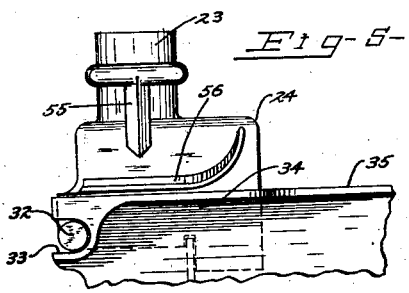
INVENTOR.
August F. Klinzing.
BY
Morsell, Keeney & Morsell
ATTORNEYS.

Patented Aug. 10, 1926.

1,595,104

UNITED STATES PATENT OFFICE.

AUGUST F. KLINZING, OF MILWAUKEE, WISCONSIN.

DRINKING FOUNTAIN.

Application filed July 28, 1924. Serial No. 728,650.

This invention relates to drinking fountains for animals, and has for one of its objects to provide a device of this character which will be simple in construction, comparatively inexpensive to manufacture and install and more efficient in use than those which have been heretofore proposed.

A further object of the invention is to provide a drinking fountain for animals having a minimum number of parts, and in which provision is made for adjustment whereby the flow of water to the fountain bowl may be prevented should it be desired to keep the animals from drinking while in an overheated condition.

A still further object of the invention is to provide a fountain of the character described in which the bowl is provided with a valve controlling lever adapted to be actuated by the animal and in which the bowl is so mounted that it may be adjusted to render the said valve controlling lever operative or inoperative at will.

A still further object of the invention is to provide a mounting for the bowl whereby the fountain may be positioned at different angles relative to the support which may be best suited to facilitate the drinking by the animals.

With the above and other objects in view, which will appear as the description proceeds, the invention consists in the novel details of construction, combinations and arrangements of parts, more fully hereinafter described and particularly pointed out in the appended claims.

Referring to the accompanying drawings in which like numerals designate like parts in all the views:—

Figure 1 is a central vertical sectional view of a drinking fountain constructed in accordance with the present invention;

Fig. 2 is a horizontal cross sectional view, taken approximately on the plane indicated by the line 2—2 in Fig. 1, looking down, the portion of the supply pipe extending to a source of supply being omitted;

Fig. 3 is a vertical sectional view of the fountain shown in Fig. 1, taken approximately on the plane indicated by the line 3—3 in the said figure;

Fig. 4 is a detail fragmentary cross sectional view, taken approximately on the plane indicated by the line 4—4 of Fig. 1; and, Fig. 5 is a fragmentary side elevational view of the bowl and valve housing which supports the same, showing the pivotal connection between the two.

Referring more particularly to the said drawings, the numeral 10 indicates a stanchion or other suitable support, to which is secured, as by the bolts 11, a bracket or clamping member 12, which preferably comprises two separate members, 13 and 14, which may be clampingly secured together by the bolt 15. The said members are provided adjacent their outer ends with the substantially semi-circular recesses, 16 and 17, the edges of which are notched or grooved, as indicated at 18, to receive portions of the valve housing or casing, whereby different angular adjustments of the fountain may be obtained, all as will appear more fully below.

A water supply pipe 20 has its upper end reversely bent, as indicated at 21, and threaded, as indicated at 22, to receive the complementary threaded nipple 23 of the valve housing or casing 24. The said housing or casing 24 is hollow, as clearly shown in Fig. 1, to provide a valve chamber 25, in which is mounted the water controlling valve 26, which is normally maintained in the closed position by means of the valve spring 27. The valve stem 28, which is grooved or fluted, as is common in this type of apparatus, extends through a suitable guide nut 29, the upper end of which forms a seat for the said valve 26, as will be readily understood.

The valve casing or housing 24 is provided with a pair of lugs or ribs 31, preferably located to the rear of the nut 29, and valve 26, as shown in Fig. 1, which ribs or lugs are provided with the oppositely extending pins or trunions 32 which are adapted to be received in recesses 33 formed in the ends of the spaced ears 34, with which the drinking bowl 35 is provided, see Figs. 1, 3 and 5. The said pins 32 and recesses 33, thus constitute a readily separable connection between the removable bowl 35 and the stationary valve casing 24, and in order to retain the members in their assembled positions there is provided a locking mechanism which will now be described.

Extending through the ribs or lugs 31, substantially in axial alignment with the discharge end 21 of the pipe 20, is a transverse pin 36, on which is pivotally mounted a yoke member 37, clearly shown in Figs 1 and 3. The said yoke, as will be clear from Fig. 3, is provided with an enlarged opening 38, extending transversely through the same, and the bottom of the said yoke is also provided with a hole 39 through which passes one end of a bolt 40 which carries a nut 41 positioned within the enlarged aperture 38. The said bolt carries at its headed end, a finger member or head 42, above which is mounted a bridge member 43, the upper edge 44 of which is adapted to be received in recesses 45, provided in the lower edges of the flanges 34 of the bowl member. The aperture 38 formed in the yoke 37, is of such dimensions that it will accommodate the nut 41, which will prevent the turning of the same, and it therefore follows that if the bolt 40 be rotated by means of its enlarged head 42, that the transverse bridge member 43 may be caused to engage and disengage with the notches 45 in the ears or flanges 34 of the bowl member 35. When the said bridge member is thus engaged with the notches, the bowl will be rigidly held in operative position shown in Fig. 1, while, if the bolt 40 be moved to permit the bridge member to drop to disengage the said notches, then the entire locking mechanism comprising the yoke 37, bolt 40 and bridge member 41, may be pivotally swung about the pin 36, as indicated in dotted lines in Fig. 1, to permit the bowl member to likewise drop to the position indicated in dotted lines for a purpose which will now be described.

The said bowl member is provided with a pair of rigid lugs 50, see Figs. 1 and 4, upon which is fulcrumed a valve operating lever 51. The short end 52 of the said lever extends inwardly beneath the lower end of the valve stem 28, while the longer end 53 of the said lever preferably takes the form of a spider substantially as shown, and is located within the enlarged portion of the bowl 35, as will be readily apparent. When the parts are in the full line position shown in Fig. 1, if an animal places its nose into the bowl for the purpose of drinking, it will depress the long end 53 of the lever and raise the short end thereof, which movement will, of course, have the effect of opening the valve 26 to permit a flow of water from the supply pipe 20 into the bowl in the manner which is well known in this type of apparatus.

The flow of water will, of course, continue as long as the valve is thus held open by the animal, and in this connection it might be pointed out that the operating lever 51 is so positioned that the bowl will not overflow, since the lever is so low that before the liquid level reaches the upper edge of the bowl, it will completely cover the nostrils of the animal, thus causing it to remove its head from the bowl in order to breathe. Of course, as soon as the animal releases the valve operating lever, the spring 27 will immediately close the valve and shut off the supply of water.

It sometimes happens, as for example if the animal is in an overheated condition, that it is not desired to permit it to drink, and when this occurs, the device may be rendered inoperative temporarily by merely backing off on the bolt 40 until the transverse bridge member 43 is disengaged from the notches 45, and then moving the parts to the dotted line position shown in Fig. 1. The dropping of the bowl about its pivotal connection 32 will also drop the operating lever 51 so that its short arm will be so spaced from the lower end of the valve stem 28 that movement of the said lever will not operate the valve. It thus results that the supply of water will be temporarily cut off from the bowl until the parts are again restored to their full line positions.

It will also be obvious that if it be desired to entirely remove the bowl for cleaning purposes, this may be accomplished by merely moving the locking bolt and its associated parts still further to the left, as viewed in Fig. 1 and then merely withdrawing the bowl toward the right, as viewed in the said figure, whereupon its recesses 33 will be disengaged from the pins or trunnions 32 and the bowl may be readily separated from the rest of the device. After it has been cleaned, it may be returned to its operative position, as will be readily understood.

In order that the bowl may be adjusted angularly relative to the support, to the position best suited for the animals, the valve casing 24 is provided with the vertical ribs 55, see Figs. 2, 3 and 5, which ribs are adapted to be received in the notches or recesses 18, provided upon the inner circumference of the recesses 17 of the clamping member 12. It will be obvious that by loosening the clamping member and turning the valve casing 24 to cause the said ribs 55 to engage different pairs of these notches, that different angled positions of the fountain may be obtained, such for example as indicated in dotted lines in Fig. 2.

The said valve casing 24 will also be provided with a pair of guide lugs 56, see Figs. 3 and 5, to facilitate the mounting and removal of the bowl member 35.

While one form of the invention has been illustrated and described, it is obvious that those skilled in the art may vary the details of construction as well as the arrangement of parts without departing from the spirit of the invention and therefore it is not wished to be limited to the above disclosure except as may be required by the accompanying claims.

What is claimed is:—

1. In a drinking fountain for animals, a valve; a bowl pivotally secured in position to receive water from said valve; means in said bowl for controlling said valve; and means whereby said bowl may be adjusted relative to said valve to render said controlling means inoperative.

2. In a drinking fountain for animals, a valve provided with a casing; a bowl pivotally secured to said casing in position to receive water from said valve; animal actuated means in said bowl for controlling said valve; and means whereby said bowl may be adjusted relative to said casing to render said controlling means inoperative.

3. In a drinking fountain for animals, a valve provided with a casing; a bowl readily detachably pivotally secured to said casing in position to receive water from said valve; animal actuated means in said bowl for controlling said valve; and means for retaining said bowl in said position, said means permitting said bowl to be dropped slightly about its pivot to render said controlling means inoperative.

4. In a drinking fountain for animals, a valve provided with a casing; a pair of laterally projecting trunnions carried by said casing; a bowl having recesses to receive said trunnions whereby it may be readily removably mounted on said trunnions in position to receive water from said valve; means within said bowl for controlling said valve; and threaded means pivotally carried by said casing for engaging said bowl to retain it in operative position, said means permitting said bowl to be entirely removed, or to be partially dropped to render said valve controlling means inoperative.

5. In a drinking fountain for animals, a valve provided with a casing; a pair of laterally projecting trunnions carried by said casing; a bowl having a pair of ears provided with two sets of recesses, one of said sets being arranged to receive said trunnions whereby said bowl may be readily removably mounted thereon in position to receive water from said valve; animal actuated means within said bowl for controlling said valve; and a bolt pivotally carried by said casing, provided with a bridge member adapted to engage the other set of bowl ear recesses, for retaining said bowl in operative position.

6. In a drinking fountain for animals, a valve casing constituting a bowl supporting member, having a nipple provided with a vertical exterior rib; and a clamping bracket having an aperture to receive said nipple, said aperture being provided with angularly disposed notches to receive said rib.

In testimony whereof, I affix my signature.

AUGUST F. KLINZING.